United States Patent
Ji et al.

(10) Patent No.: US 12,443,003 B2
(45) Date of Patent: Oct. 14, 2025

(54) LENS BARREL

(71) Applicant: GENIUS ELECTRONIC OPTICAL (XIAMEN) CO., LTD., Fujian (CN)

(72) Inventors: Zhizhong Ji, Fujian (CN); Jiayu Cai, Fujian (CN); Haibin Zhan, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 601 days.

(21) Appl. No.: 17/888,503

(22) Filed: Aug. 16, 2022

(65) Prior Publication Data

US 2024/0019659 A1    Jan. 18, 2024

(30) Foreign Application Priority Data

Jul. 18, 2022    (CN) .......................... 202210841130.2

(51) Int. Cl.
*G02B 7/02* (2021.01)
(52) U.S. Cl.
CPC .................... *G02B 7/021* (2013.01)
(58) Field of Classification Search
CPC ...................................... G02B 7/021
See application file for complete search history.

(56) References Cited

U.S. PATENT DOCUMENTS

| | | | |
|---|---|---|---|
| 2018/0129011 A1* | 5/2018 | Tsai | H04N 23/55 |
| 2022/0163750 A1* | 5/2022 | Hu | G02B 7/021 |

FOREIGN PATENT DOCUMENTS

CN        213659064 U  *  7/2021

* cited by examiner

*Primary Examiner* — Edmond C Lau
(74) *Attorney, Agent, or Firm* — JCIPRNET

(57) ABSTRACT

A lens barrel includes a lens barrel surrounding wall and a cover member. The lens barrel surrounding wall surrounds an optical axis. The lens barrel surrounding wall includes a lens element accommodating portion abutted against lens elements. The lens barrel surrounding wall has an object side connecting surface closest to an object side and facing the object side. An inner diameter of the lens element accommodating portion closest to the object side is greater than an inner diameter of the lens element accommodating portion closest to an image side. The cover member has an image side connecting surface facing the image side. The image side connecting surface of the cover member is fixed on the object side connecting surface of the lens barrel surrounding wall, wherein a maximum outer diameter of the cover member is less than or equal to a maximum outer diameter of the lens barrel surrounding wall.

18 Claims, 10 Drawing Sheets

LENS BARREL

CROSS-REFERENCE TO RELATED APPLICATION

This application claims the priority benefit of China application serial no. 202210841130.2, filed on Jul. 18, 2022. The entirety of the above-mentioned patent application is hereby incorporated by reference herein and made a part of this specification.

BACKGROUND OF THE INVENTION

Field of the Invention

The invention relates to an optical device, and more particularly, to a lens barrel.

Description of Related Art

In recent years, the optical imaging lens has continued to evolve. In addition to requiring the lens to be light, thin, and short, the imaging quality of the lens is equally important. In addition to parameters such as the surface shape of the lens elements or the air gap between the lens elements affecting optical imaging quality, the smoothness of the adhesive dispensing procedure during the assembly of the lens elements and the optical ring element is also a major factor affecting optical imaging quality.

The traditional lens barrel designs are all integrally formed, and the structure design of the light-shielding portion of the lens barrel near the object side forms a minimum light-passing hole forcing the lens element assembly sequence to be sequentially assembled from the lens element on the object side end to the image side end. If the effective diameter of the lens element closest to the object side is the largest among all lens elements, due to the limitation of the lens element assembly sequence, the aperture of the lens element accommodating portion of the lens barrel surrounding wall at the image side end may not be less than the aperture of the object side end, thus forcing the outer diameter of several lens elements with small effective diameters at the image side end to increase accordingly, thereby affecting the yield of lens element injection molding.

The invention provides a lens barrel that may be designed to be gradually reduced from the object side to the image side, so that the outer diameter of the lens element close to the image side may be reduced, thereby improving manufacturing yield.

SUMMARY OF THE INVENTION

The invention provides a lens barrel that may improve manufacturing yield.

The invention provides a lens barrel including a lens barrel surrounding wall and a cover member. The lens barrel surrounding wall surrounds an optical axis. The lens barrel surrounding wall includes a lens element accommodating portion abutted against a plurality of lens elements. The lens barrel surrounding wall has an object side connecting surface closest to an object side and facing the object side. An inner diameter of the lens element accommodating portion closest to the object side is greater than an inner diameter of the lens element accommodating portion closest to an image side. The cover member has an image side connecting surface facing the image side. The image side connecting surface of the cover member is fixed on the object side connecting surface of the lens barrel surrounding wall, wherein a maximum outer diameter of the cover member is less than or equal to a maximum outer diameter of the lens barrel surrounding wall.

The invention further provides a lens barrel including a lens barrel surrounding wall and a cover member. The lens barrel surrounding wall surrounds an optical axis. The lens barrel surrounding wall includes a lens element accommodating portion abutted against a plurality of lens elements. The lens barrel surrounding wall has a connecting portion close to an object side, and an inner diameter of the lens element accommodating portion closest to the object side is greater than an inner diameter of the lens element accommodating portion closest to an image side. Both a first lens element counted from the object side and a first lens element counted from the image side are abutted against an inner side surface of the lens element accommodating portion facing the optical axis. A maximum outer diameter of the lens barrel surrounding wall corresponding to where the inner side surface of the lens element accommodating portion and the first lens element counted from the object side are abutted is less than a maximum outer diameter of the lens barrel surrounding wall corresponding to where the inner side surface of the lens element accommodating portion and the first lens element counted from the image side are abutted. The cover member is fixed on the connecting portion of the lens barrel surrounding wall.

The invention further provides a lens barrel including a lens barrel surrounding wall and a cover member. The lens barrel surrounding wall surrounds an optical axis. The lens barrel surrounding wall includes a lens element accommodating portion abutted against a plurality of lens elements and an outer surrounding surface facing away from the optical axis, and the second lens element counted from an image side is abutted against an inner side surface of the lens element accommodating portion facing the optical axis. The lens barrel surrounding wall also has a connecting portion close to an object side. The cover member is fixed on the connecting portion of the lens barrel surrounding wall, and the cover member is not in direct contact with the outer surrounding surface. In particular, the lens barrel satisfies $(DS3-DS4)/(DS1-DS2) \geq 6.000$, wherein DS1 is a vertical distance between a position of the outer surrounding surface closest to the object side and the optical axis, DS2 is a maximum outer diameter of the cover member, DS3 is a maximum outer diameter of the lens barrel surrounding wall corresponding to where the inner side surface of the lens element accommodating portion is abutted against a second lens element counted from the image side, and DS4 is a maximum inner diameter of the lens barrel surrounding wall corresponding to where the inner side surface of the lens element accommodating portion is abutted against the second lens element counted from the image side.

Based on the above, in the lens barrel of the invention, the lens barrel is divided into two parts: the cover member and the lens barrel surrounding wall. When the lens elements are assembled, because the cover member and the lens barrel surrounding wall are not integrally formed, the lens elements may be assembled in the lens barrel surrounding wall first, and then the cover member is fixed on the lens barrel surrounding wall. That is, the sequence of lens element assembly is not limited by the light-passing hole aperture of the cover member surrounding the optical axis being smaller than the size of the lens elements, and the lens element assembly sequence from the image side end to the object side end in sequence may be achieved. In this way, the inner diameter of the lens element accommodating portion of the lens barrel surrounding wall may be designed to be gradually reduced from the object side to the image side, so that the outer diameter of the lens element close to the image side may be reduced, thereby improving lens manufacturing yield.

In order to make the aforementioned features and advantages of the disclosure more comprehensible, embodiments accompanied with figures are described in detail below.

DESCRIPTION OF THE EMBODIMENTS

Figure 1:
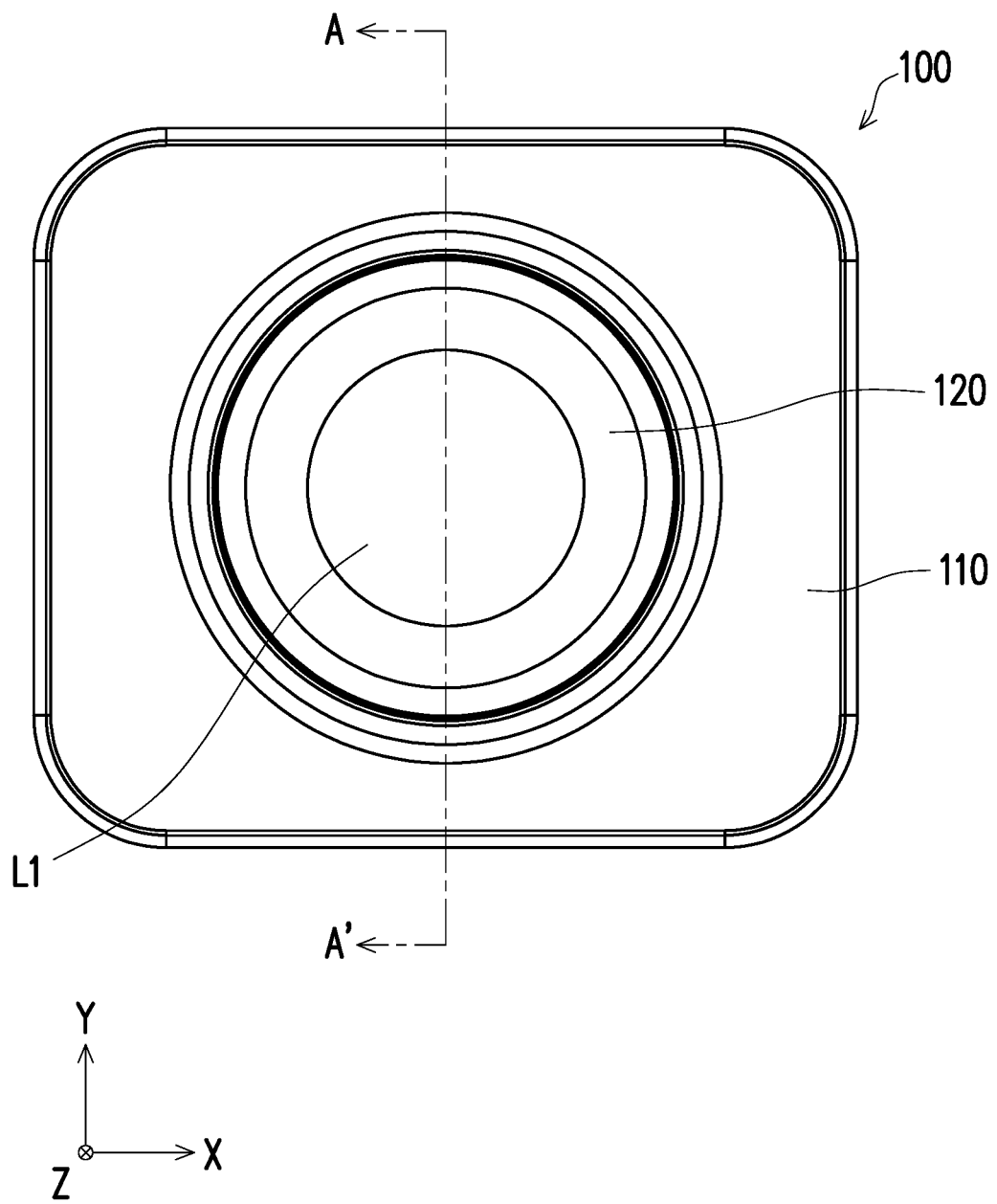
FIG. 1 is a schematic front view of a lens barrel of the first embodiment of the invention.
Figure 2:
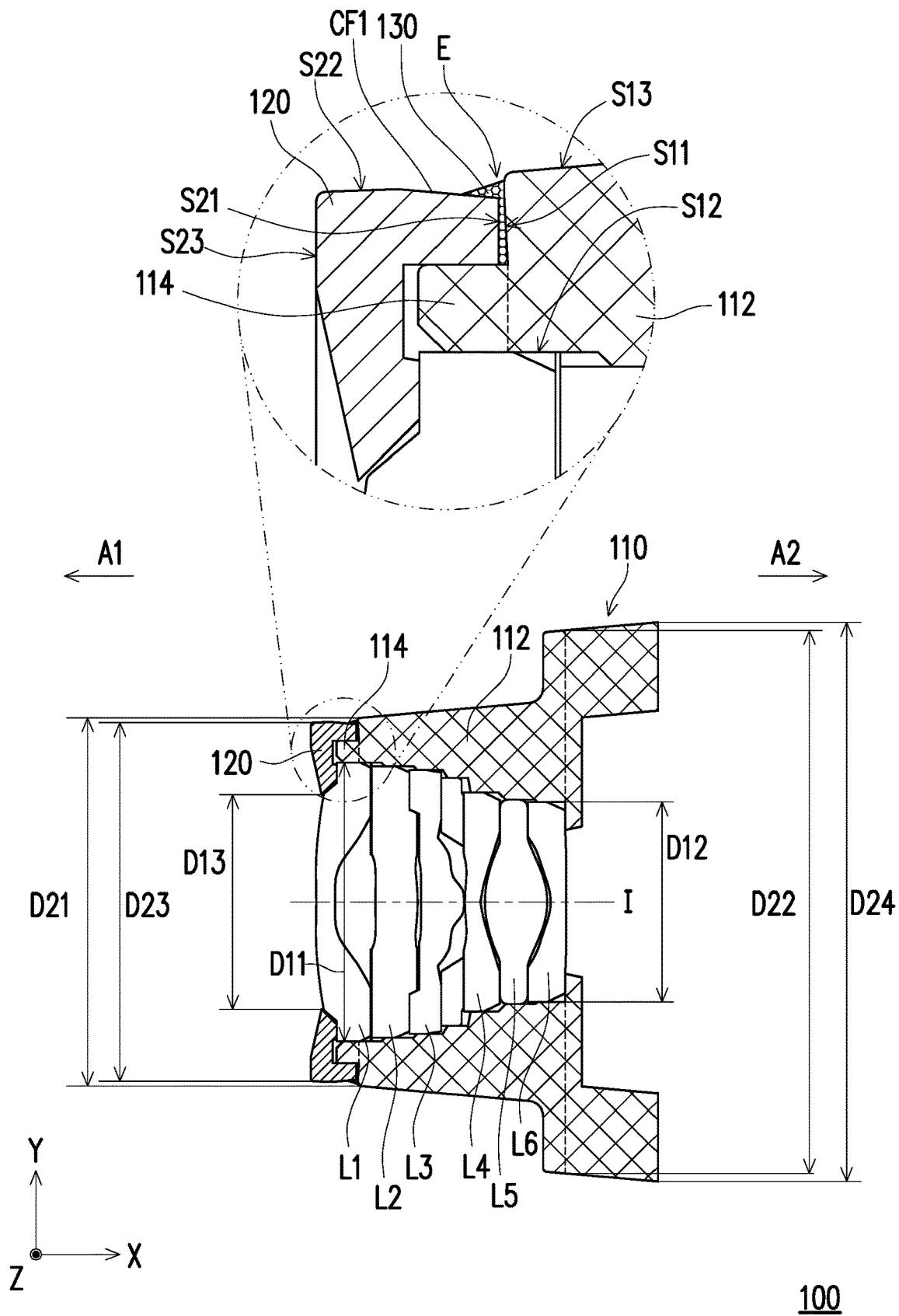
FIG. 2 is a schematic cross-sectional view of the lens barrel of FIG. 1 along dashed line A-A'.

FIG. 1 is a schematic front view of a lens barrel of the first embodiment of the invention. FIG. 2 is a schematic cross-sectional view of the lens barrel of FIG. 1 along dashed line A-A'. Please refer to FIG. 1 and FIG. 2. In the present embodiment, a lens barrel 100 is mainly used for photographing and video recording, such as a portable electronic device such as a mobile phone, a camera, a tablet computer, and a personal digital assistant (PDA), and the invention is not limited thereto. The lens barrel 100 includes a lens barrel surrounding wall 110 and a cover member 120 for mounting the elements of lens elements L1 to L6, and forming an optical lens with the lens elements L1 to L6, and has the function of protecting the internal optical paths of the lens elements L1 to L6 and the optical lens. Each of the lens elements L1 to L6 (or lenses) is, for example, an optical element having refractive power, and each has an object side surface facing an object side A1 and an image side surface facing an image side A2. In the present embodiment, the optical lens includes, for example, six lens elements L1 to L6. In other embodiments, the number of lens elements may also be seven or even eight or more or less than six, such as two, three, or four. The number thereof is only an example, and the invention is not limited to the number of lens elements.

The lens barrel surrounding wall 110 surrounds an optical axis I, and the lens barrel surrounding wall 110 includes a lens element accommodating portion 112 abutted against the plurality of lens elements L1 to L6. The lens barrel surrounding wall 110 has an object side connecting surface S11 closest to the object side A1 and connected to the cover member 120 and facing the object side A1, an inner side surface S12 of the lens element accommodating portion 112 facing the optical axis I, and an outer surrounding surface S13 facing away from the optical axis I. In particular, the outermost edge of the first lens element (i.e., the lens element L1) counted from the object side A1 is abutted against the inner side surface S12 of the lens element accommodating portion 112 facing the optical axis I, and an inner diameter D11 of the lens element accommodating portion 112 closest to the object side A1 is greater than an inner diameter D12 of the lens element accommodating portion 112 closest to the image side A2. Therefore, a one-time focusing action may be performed after the lens elements L1 to L6 are assembled, and no additional focusing is needed when the cover member 120 is joined to the lens barrel surrounding wall 110, thus saving man-hours and at the same time not readily causing the issue of eccentricity. Specifically, the first lens element (i.e., the lens element L1) counted from the object side A1 and the first lens element (i.e., the lens element L6) counted from the image side A2 are both abutted against the inner side surface S12 of the lens element accommodating portion 112 facing the optical axis I. The inner diameter of the lens element accommodating portion 112 is gradually reduced from the object side A1 to the image side A2 along with the outer diameters of the lens elements L1 to L6. In other words, the inner side surface S12 of the lens element accommodating portion 112 is extended and changed toward the optical axis I along with the outer shapes of the plurality of lens elements L1 to L6.

In the present embodiment, a maximum outer diameter D21 of the lens barrel surrounding wall 110 corresponding to where the inner side surface S12 of the lens element accommodating portion 112 and the first lens element (i.e., the lens element L1) counted from the object side A1 are abutted is less than a maximum outer diameter D22 of the lens barrel surrounding wall 110 corresponding to where the inner side surface S12 of the lens element accommodating portion 112 and the first lens element (i.e., the lens element L6) counted from the image side A2 are abutted. In this way, the area of the portable electronic screen occupied by the lens may be reduced.

The cover member 120 has an image side connecting surface S21 facing the image side A2, an outer side surface S22 connected to the image side connecting surface S21 and facing away from the optical axis I, and an object side surface S23 facing the object side A1. In particular, the image side connecting surface S21 of the cover member 120 is fixed on the object side connecting surface S11 of the lens barrel surrounding wall 110 (e.g., the object side surface on the lens element accommodating portion 112). Specifically, in the present embodiment, the lens barrel surrounding wall 110 has a connecting portion 114 close to the object side A1, and the cover member 120 is fixed on the connecting portion 114 of the lens barrel surrounding wall 110. The cover member 120 and the lens barrel surrounding wall 110 are fixed by, for example, a colloid 130. For example, in the present embodiment, there is a colloid accommodating space E between the cover member 120 and the lens barrel surrounding wall 110 for coating or injecting the colloid 130 for combining. By using the colloid 130 for fixing, it is not necessary to use other structures or fixing members for fixing, and the size of the cover member 120 may also be designed to be smaller at the same time, so as to avoid increasing the volume of the object side end of the lens. Furthermore, the cover member 120 may be designed with a chamfer CF1, so that the colloid 130 may flow into the colloid accommodating space E more readily, and the bonding area of the colloid 130 may be further increased to increase reliability. Preferably, the outer side surface S22 of the cover member 120 and the object side connecting surface S11 of the lens barrel surrounding wall 110 may form an included angle of less than 90 degrees, which not only makes it easier for the colloid 130 to flow into the colloid accommodating space E, but also makes it easier to control the amount of adhesive dispensed to avoid spillage of the adhesive.

In terms of the appearance characteristics of the structure, a maximum outer diameter D23 of the cover member 120 is less than or equal to a maximum outer diameter D24 of the lens barrel surrounding wall 110, and a minimum aperture D13 of the light-passing hole formed by the cover member 120 surrounding the optical axis I is less than the inner diameter D11 of the lens element accommodating portion 112 closest to the object side A1, so that the cover member 120 may simultaneously block stray light and have the function of fixing the lens elements L1 to L6. In addition, the cover member 120 is not in direct contact with the outer surrounding surface S13 of the lens barrel surrounding wall 110. In other words, the contact portion between the lens barrel surrounding wall 110 and the cover member 120 is not the outer surrounding surface S13. Moreover, in the present embodiment, the object side surface S23 of the cover member 120 has a texture, such as any pattern structure of fine bumps or dips on the surface, and the invention is not limited thereto. In this way, when light hits the cover member 120, the light is not readily reflected, thus helping to keep the appearance of the lens consistent with the color of the screen.

In this way, compared with the conventional lens barrel, the present embodiment splits the lens barrel 100 into two parts, the lens barrel surrounding wall 110 and the cover member 120. When the lens elements L1 to L6 are assembled, since the cover member 120 and the lens barrel surrounding wall 110 are not integrally formed, after the lens elements L1 to L6 are first assembled in the lens barrel surrounding wall 110, the cover member 120 may be fixed on the lens barrel surrounding wall 110. That is, the sequence of assembling the lenses L1 to L6 is not limited by the light-passing hole aperture of the cover member 120 surrounding the optical axis I being less than the size of the lens elements L1 to L6, and thus the mounting sequence of the lens elements L1 to L6 may be achieved sequentially from the lens element (i.e., the lens element L6) at the image side A2 end to the object side A1 end. In this way, the inner diameter of the lens element accommodating portion 112 of the lens barrel surrounding wall 110 may be designed to be gradually reduced from the object side A1 to the image side A2, so that the outer diameter of the lens element close to the image side A2 may be reduced, thereby improving manufacturing yield.

In particular, when the cover member 120 is joined to the lens barrel surrounding wall 110 in such a way that the image side connecting surface S21 of the cover member 120 facing the image side A2 is fixed on the object side connecting surface S11 of the lens barrel surrounding wall 110 closest to the object side A1 and facing the object side A1, the appearance of the lens viewed by the user from the object side A1 may present a more consistent color gradation to meet the requirement that there should be no significant color difference between the lens and the screen of the portable device at this stage. Further, when the maximum outer diameter D23 of the cover member 120 is less than or equal to the maximum outer diameter D24 of the lens barrel surrounding wall 110, the volume of the lens may be better reduced.

Figure 3:
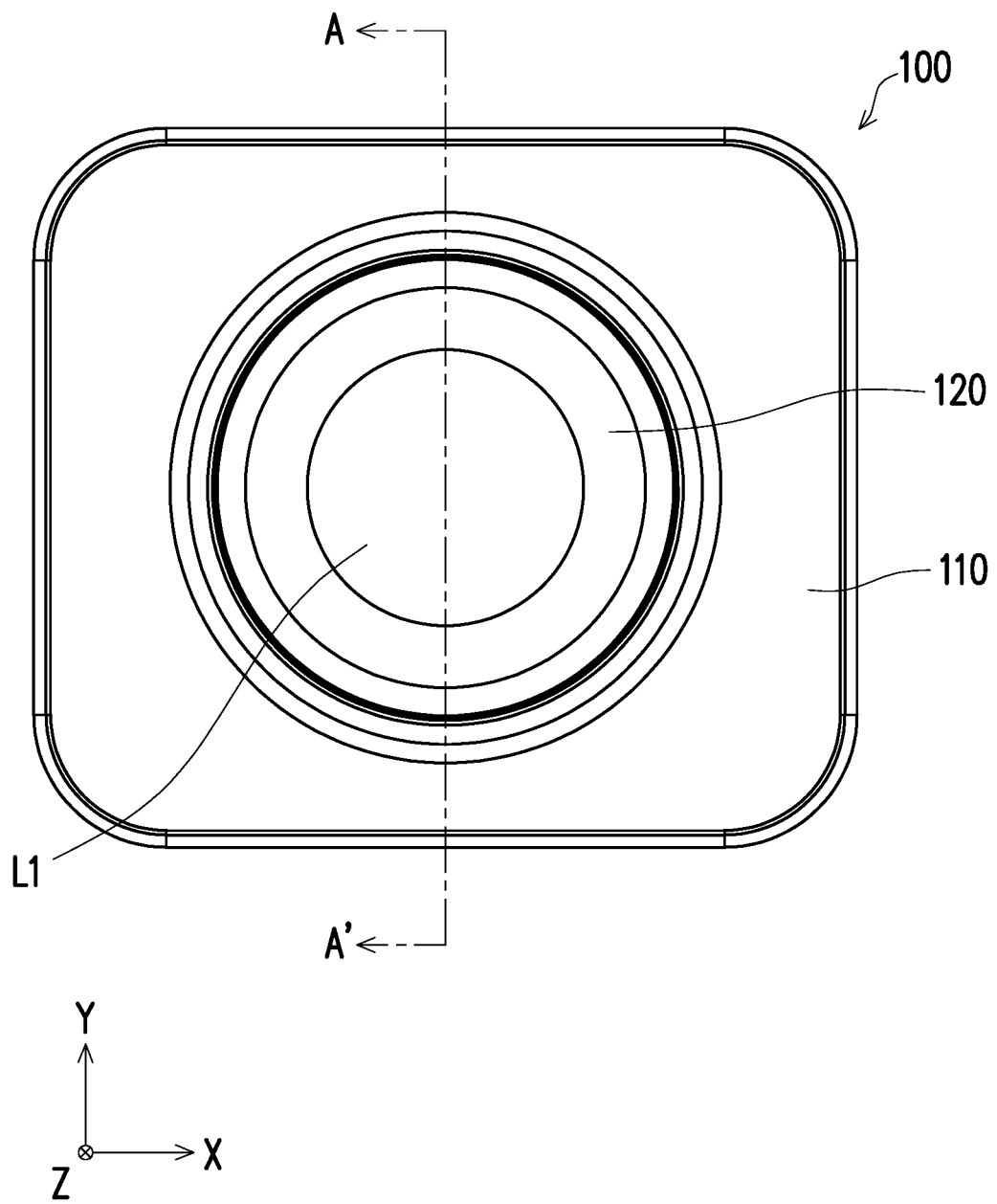
FIG. 3 is a schematic front view of a lens barrel of the second embodiment of the invention.
Figure 4:
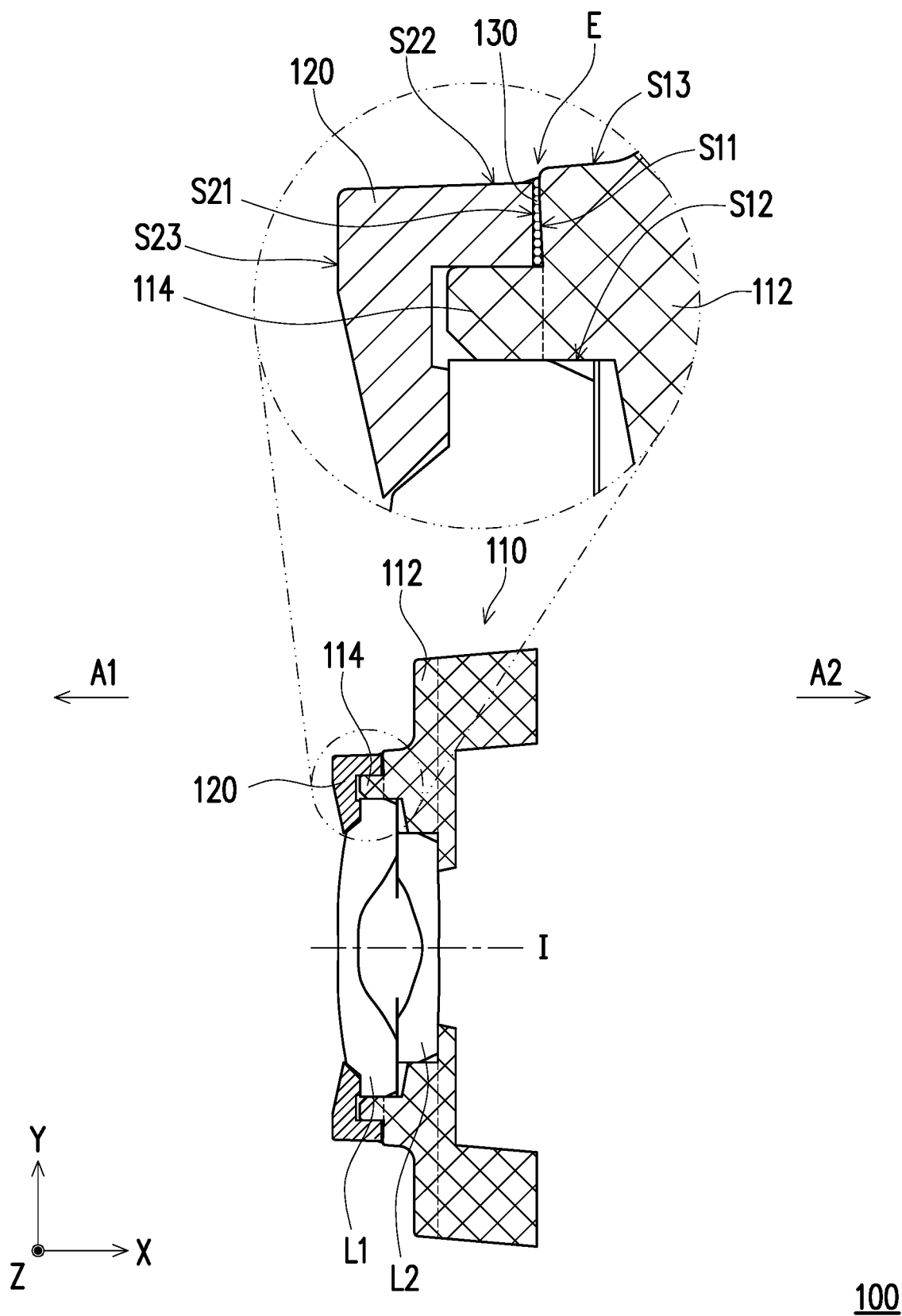
FIG. 4 is a schematic cross-sectional view of the lens barrel of FIG. 3 along dashed line A-A'.

FIG. 3 is a schematic front view of a lens barrel of the second embodiment of the invention. FIG. 4 is a schematic cross-sectional view of the lens barrel of FIG. 3 along dashed line A-A'. Please refer to FIG. 3 and FIG. 4. The lens barrel 100 of the second embodiment is similar to the lens barrel 100 shown in FIG. 1 and FIG. 2. The difference between the two is that, in the present embodiment, the lens element accommodating portion 112 of the lens barrel surrounding wall 110 has only two lens elements L1 and L2. In particular, similar to the first embodiment, the lens element accommodating portion 112 of the present embodiment has the inner side surface S12 facing the optical axis I, and the two lens elements L1 and L2 are respectively abutted against the inner side surface S12, and the inner diameter of the lens element accommodating portion 112 is reduced from the object side A1 to the image side A2 along with the outer diameters of the two lens elements L1 and L2. In other words, the inner side surface S12 of the lens element accommodating portion 112 is extended and changed toward the optical axis I along with the outer shapes of the two lens elements L1 and L2. In this way, compared to a conventional lens barrel, the inner diameter of the lens element accommodating portion 112 of the lens barrel 110 surrounding wall of the second embodiment may be designed to be gradually reduced from the object side A1 to the image side A2, so that the outer diameter of the lens element close to the image side A2 may be reduced, thereby improving manufacturing yield.

Figure 5:
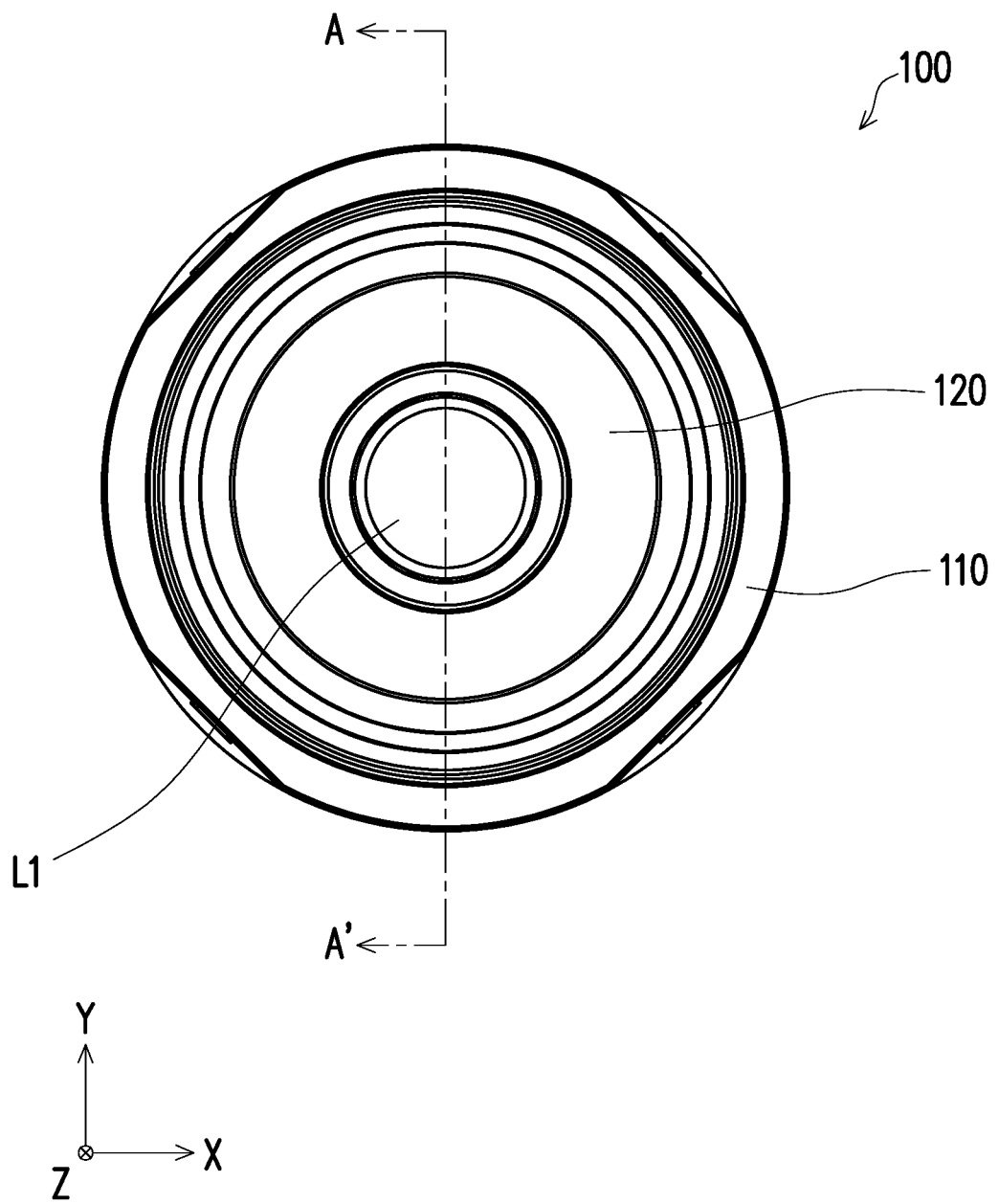
FIG. 5 is a schematic front view of a lens barrel of the third embodiment of the invention.
Figure 6:
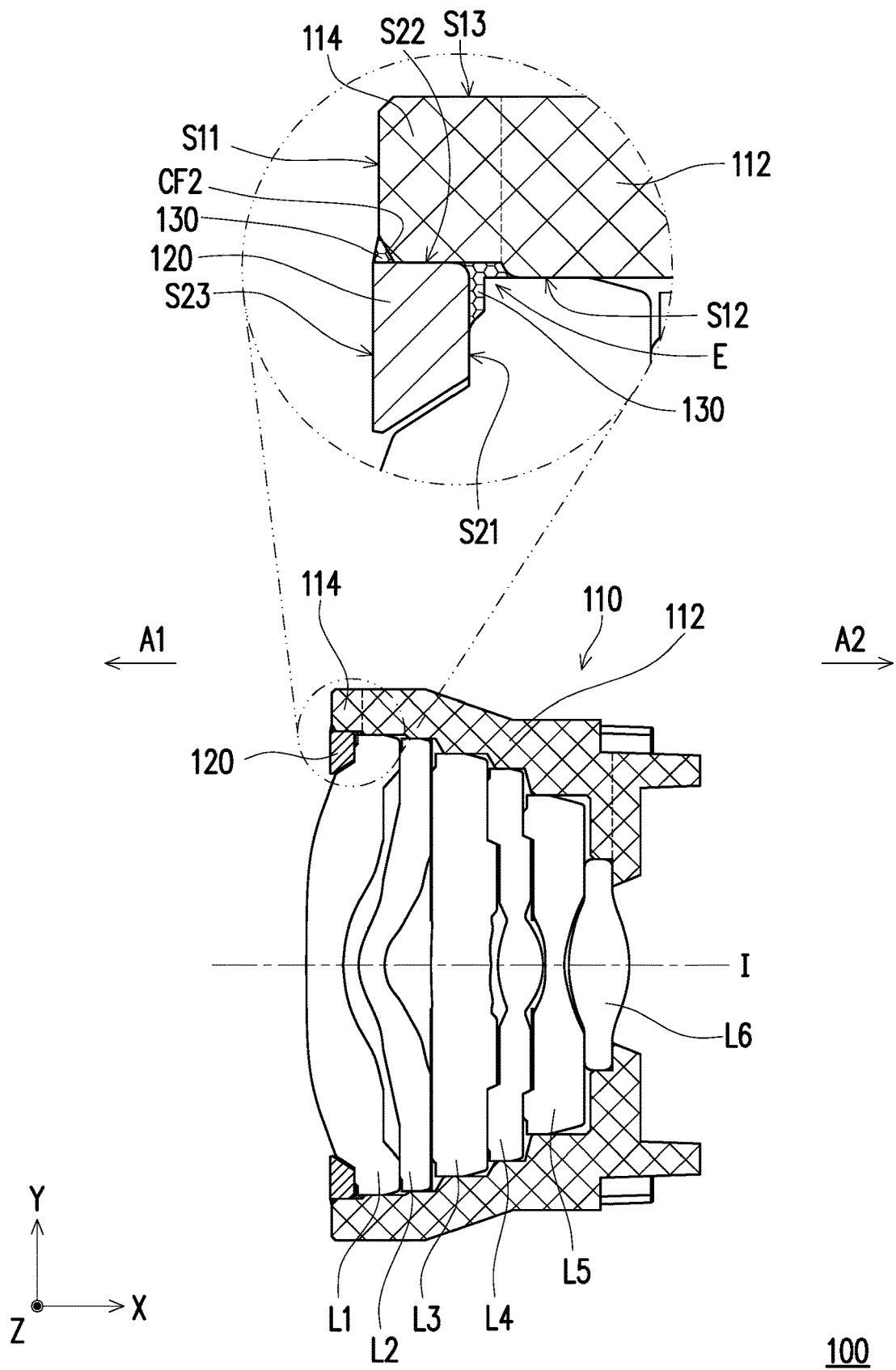
FIG. 6 is a schematic cross-sectional view of the lens barrel of FIG. 5 along dashed line A-A'.

FIG. 5 is a schematic front view of a lens barrel of the third embodiment of the invention. FIG. 6 is a schematic cross-sectional view of the lens barrel of FIG. 5 along dashed line A-A'. Please refer to FIG. 5 and FIG. 6. The lens barrel 100 of the third embodiment is similar to the lens barrel 100 shown in FIG. 1 and FIG. 2. The difference between the two is that, in the present embodiment, the outer side surface S22 of the cover member 120 facing away from the optical axis I is fixed on the inner side surface S12 of the lens barrel surrounding wall 110 facing the optical axis I. Specifically, the cover member 120 is fixed on the inner side of the connecting portion 114 of the lens barrel surrounding wall 110. Therefore, the maximum outer diameter D23 of the cover member 120 is less than or equal to the maximum outer diameter D24 of the lens barrel surrounding wall 110, and the minimum aperture D13 of the light-passing hole formed by the cover member 120 surrounding the optical axis I is less than the inner diameter D11 of the lens element accommodating portion 112 closest to the object side A1, so that the cover member 120 may simultaneously block stray light and have the function of fixing the lens elements L1 to L6. In the present embodiment, the cover member 120 is not in direct contact with the object side connecting surface S11 and the outer surrounding surface S13 of the lens barrel surrounding wall 110. Moreover, in the present embodiment, the object side connecting surface S11 of the lens barrel surrounding wall 110 may be designed with a chamfer CF2 and a flow channel (not shown), so that the colloid 130 may flow into the colloid accommodating space E more readily and further increase the bonding area of the colloid 130 to increase reliability. Therefore, the object side connecting surface S11 is indirectly connected to the cover member 120 via the colloid 130.

Figure 7:
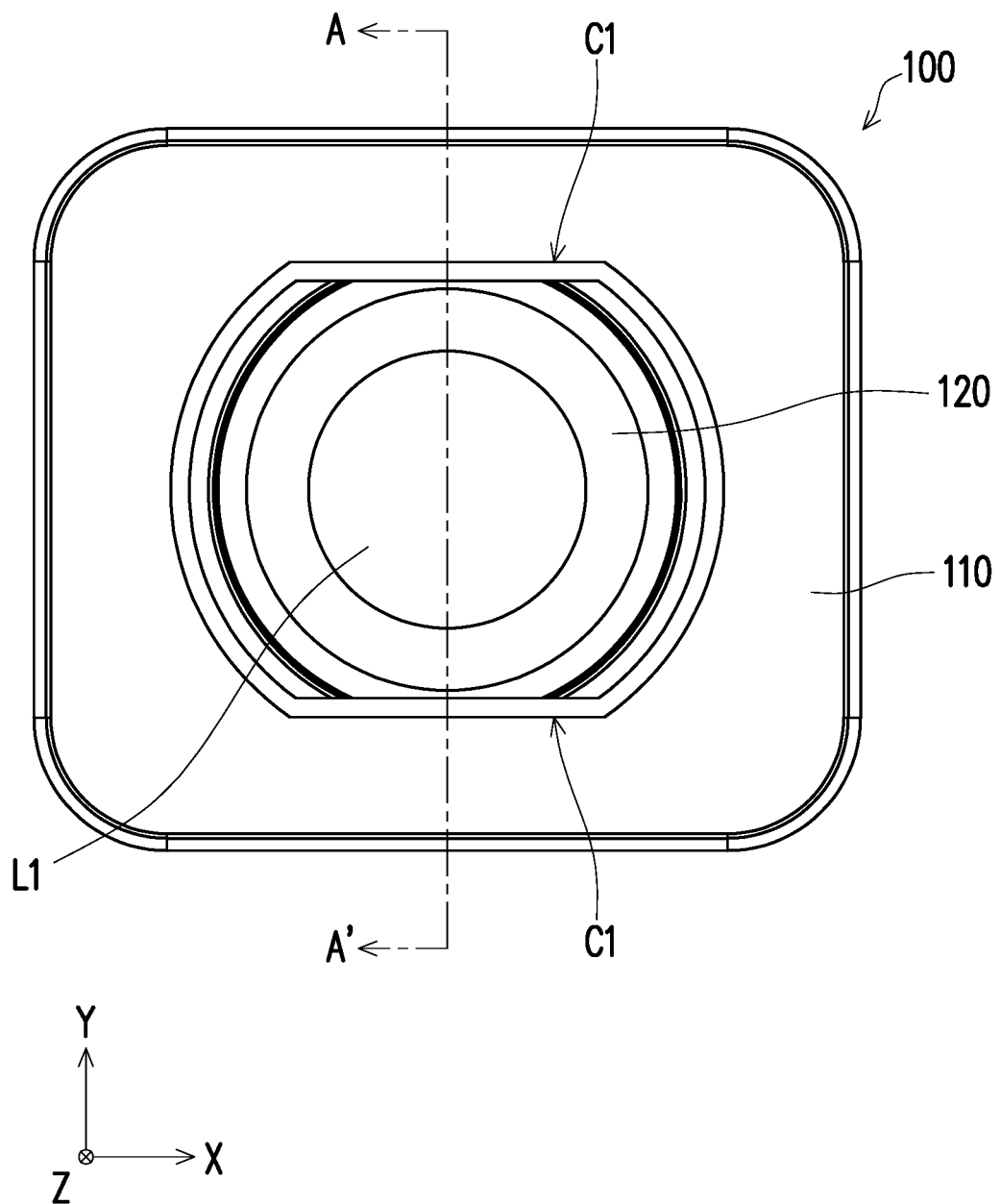
FIG. 7 is a schematic front view of a lens barrel of the fourth embodiment of the invention.
Figure 8:
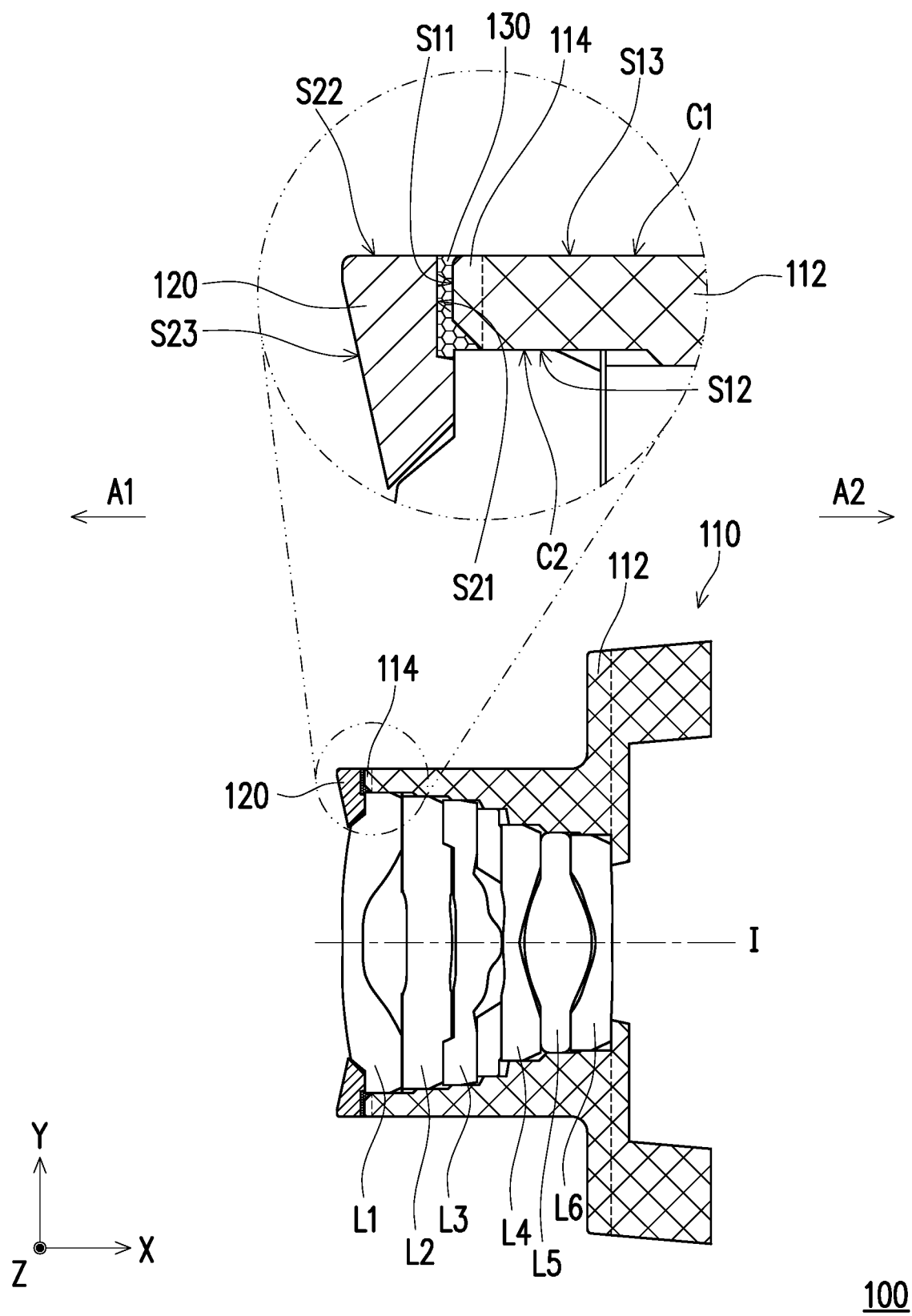
FIG. 8 is a schematic cross-sectional view of the lens barrel of FIG. 7 along dashed line A-A'.

FIG. 7 is a schematic front view of a lens barrel of the fourth embodiment of the invention. FIG. 8 is a schematic cross-sectional view of the lens barrel of FIG. 7 along dashed line A-A'. Please refer to FIG. 7 and FIG. 8. The lens barrel 100 of the fourth embodiment is similar to the lens barrel 100 shown in FIG. 1 and FIG. 2. The difference between the two is that, in the present embodiment, the lens barrel surrounding wall 110 has an outer surface (the outer surrounding surface S13) facing away from the optical axis I, and has a sectional plane C1 parallel to the optical axis I on the outer surface. For example, in the present embodiment, the lens barrel 100 has two symmetrical sectional planes C1. In this way, the volume of the lens barrel 100 may be further reduced. In the present embodiment, the outer side surface S22 of the cover member 120 may be designed to be coplanar with the sectional plane C1 on the outer surrounding surface S13 of the lens barrel surrounding wall 110, so that the appearance presents a consistent surface.

Figure 9:
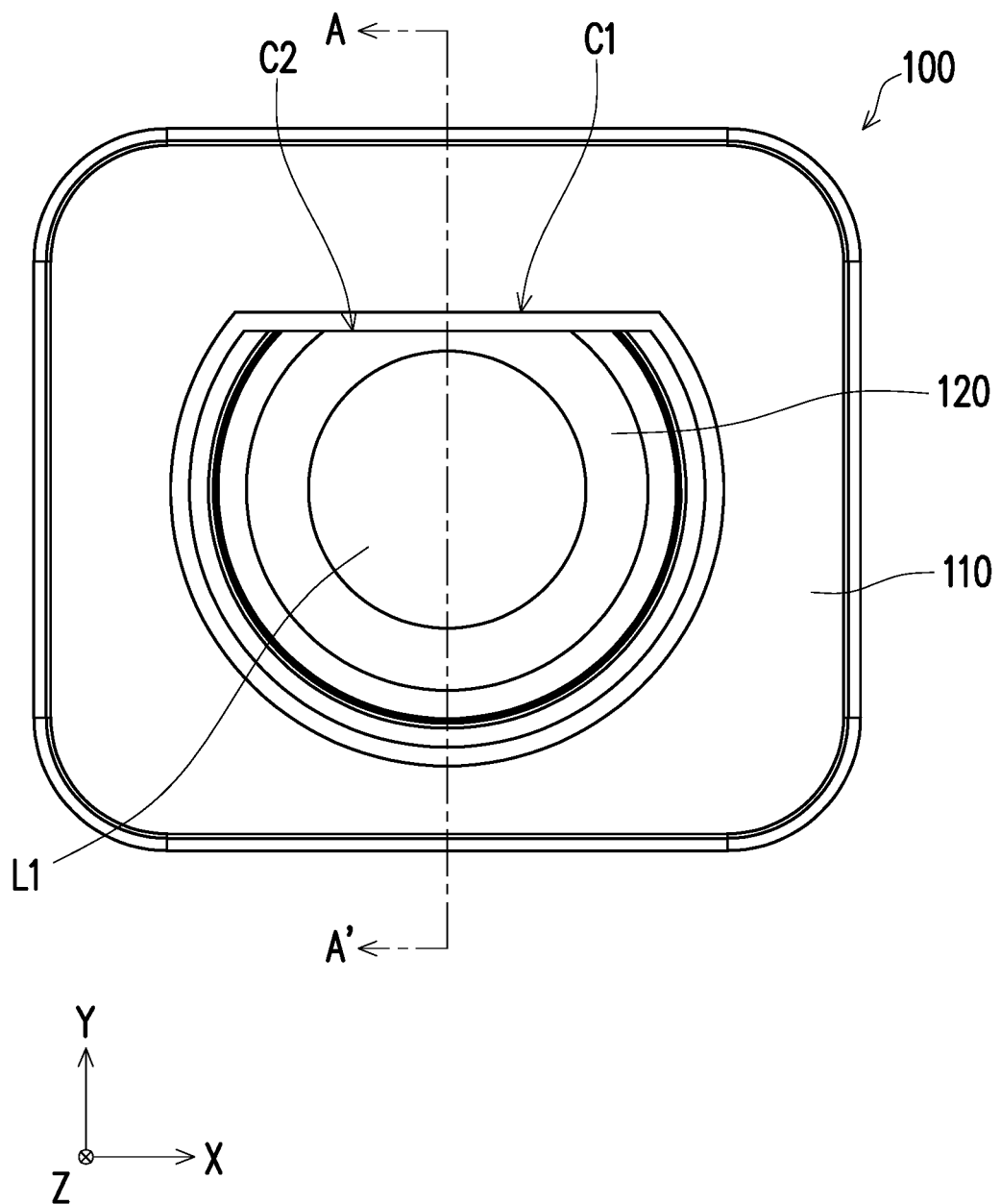
FIG. 9 is a schematic front view of a lens barrel of the fifth embodiment of the invention.
Figure 10:
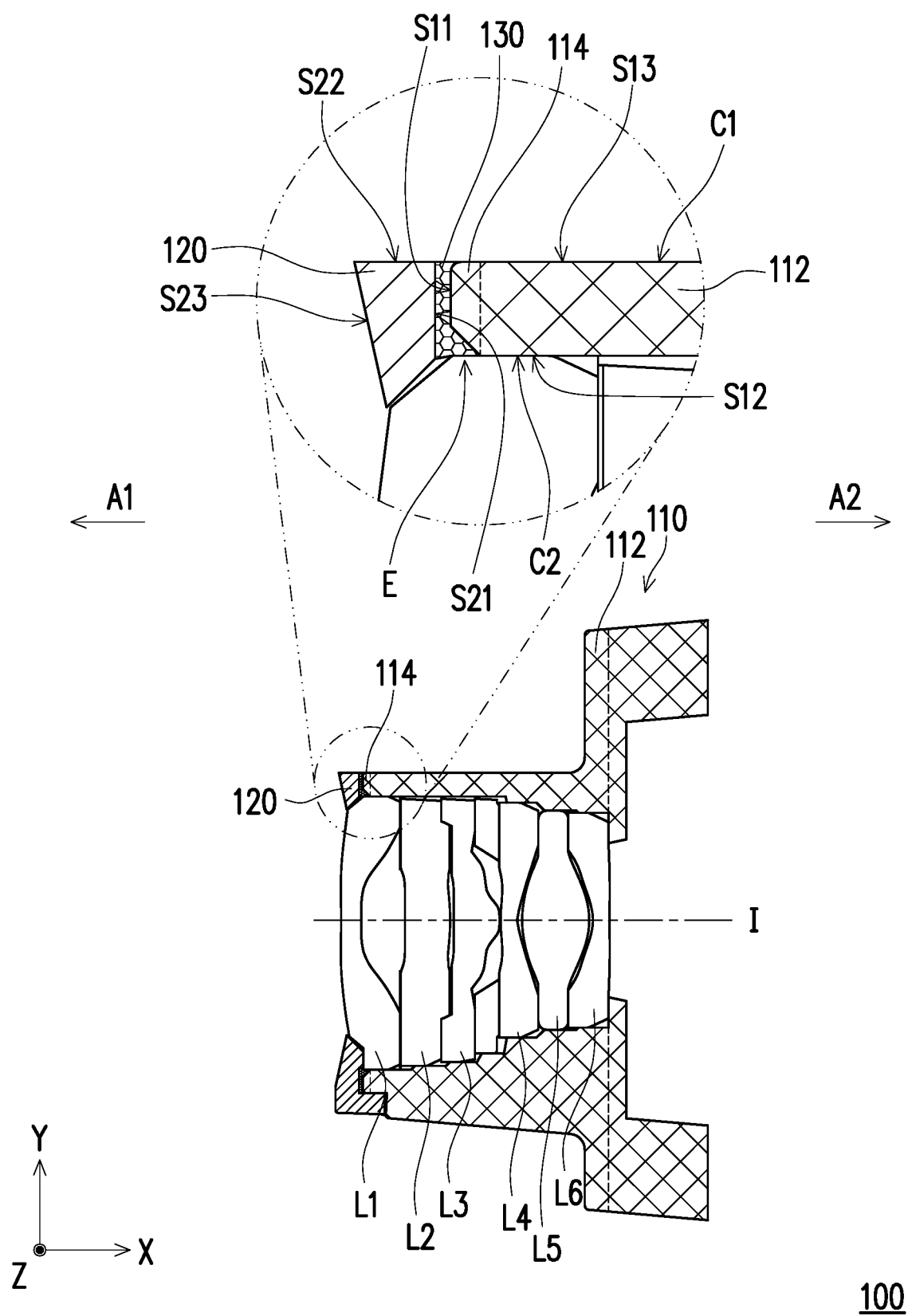
FIG. 10 is a schematic cross-sectional view of the lens barrel of FIG. 9 along dashed line A-A'.

FIG. 9 is a schematic front view of a lens barrel of the fifth embodiment of the invention. FIG. 10 is a schematic cross-sectional view of the lens barrel of FIG. 9 along dashed line A-A'. Please refer to FIG. 9 and FIG. 10. The lens barrel 100 of the fifth embodiment is similar to the lens barrel 100 shown in FIG. 7 and FIG. 8. The difference between the two is that, in the present embodiment, at least one of the lens elements L1 to L6 each has a sectional plane C2 formed between the object side surface and the image side surface. For example, in the present embodiment, the lens elements L1 to L3 have the sectional plane C2, and the optical boundaries of the lens elements L1 to L3 having the sectional plane C2 are different from the optical boundaries of the lens elements (i.e., the lens elements L4 to L6) without the sectional plane C2. For example, in the present embodiment, the lens barrel 100 has only a single-sided sectional plane C1, and the sectional planes C2 of the lens elements L1 to L3 face the sectional plane C1. In this way, the volume of the lens barrel 100 may be further reduced. In the present embodiment, the outer side surface S22 of the cover member 120 may be designed to be coplanar with the sectional plane C1 on the outer surrounding surface S13 of the lens barrel surrounding wall 110, so that the appearance presents a consistent surface. In another embodiment, the lens elements L1 to L3 may only be designed to have the sectional plane C2, and the outer surrounding surface S13 of the lens barrel surrounding wall 110 does not have the sectional plane C1, and the invention is not limited thereto.

Based on the above, the lens barrel 10 of an embodiment of the invention may obtain the following functions and advantages, wherein each important parameter is first defined as follows.

DS1 is the vertical distance between the position of the outer surrounding surface S13 closest to the object side A1 and the optical axis I;

DS2 is the maximum outer diameter D23 of the cover member 120;

DS3 is the maximum outer diameter of the lens barrel surrounding wall 110 corresponding to where the inner side surface S12 of the lens element accommodating portion 112 is abutted against the second lens element counted from the image side A2;

DS4 is the maximum inner diameter of the lens barrel surrounding wall 110 corresponding to where the inner side surface S12 of the lens element accommodating portion 112 is abutted against the second lens element counted from the image side A2;

R1 is the inner diameter of the lens element accommodating portion 112 closest to the object side A1;

R2 is the inner diameter of the lens element accommodating portion 112 closest to the image side A2;

R3 is the inner diameter of the lens element accommodating portion 112 corresponding to the position at half of the distance along the optical axis I between the lens element accommodating portion 112 closest to the object side A1 and the lens element accommodating portion 112 closest to the image side A2;

SL is the distance along the optical axis I from the position of the cover member 120 closest to the object side A1 to the position of the lens barrel surrounding wall 110 closest to the image side A2; and E is the number of lens elements.

1. In the present application, the lens barrel is divided into two parts: the cover member and the lens barrel surrounding wall. When the lens elements are assembled, because the cover member and the lens barrel surrounding wall are not integrally formed, the lens element may be assembled in the lens barrel surrounding wall first, and then the cover member is fixed on the lens barrel surrounding wall. That is, the sequence of lens element assembly is not limited by the light-passing hole aperture of the cover member surrounding the optical axis being smaller than the size of the lens elements, and the lens element assembly sequence from the image side end to the object side end in sequence may be achieved. In this way, the inner diameter of the lens element accommodating portion of the lens barrel surrounding wall may be designed to be gradually reduced from the object side to the image side, so that the outer diameter of the lens element close to the image side may be reduced, thereby improving lens manufacturing yield. In particular, when the cover member is joined to the lens barrel surrounding wall in such a way that the image side connecting surface of the cover member facing the image side is fixed on the object side connecting surface of the lens barrel surrounding wall closest to the object side and facing the object side, the appearance of the lens viewed by the user from the object side may present a more consistent color gradation to meet the requirement that there should be no significant color difference between the lens and the screen of the portable device at this stage. Further, when the maximum outer diameter of the cover member is less than or equal to the maximum outer diameter of the lens barrel surrounding wall, the volume of the lens may be better reduced.

2. With the above design, when the outermost edge of the first lens element counted from the object side is abutted against the inner side of the lens element accommodating portion facing the optical axis, a one-time focusing action may be performed after the lens elements are assembled, and when the cover member is joined with the lens barrel surrounding wall, no additional focusing is needed, thus saving man-hours and at the same time not readily causing the issue of eccentricity.

3. In the present application, the lens barrel is divided into two parts: the cover member and the lens barrel surrounding wall. When the lens elements are assembled, because the cover member and the lens barrel surrounding wall are not integrally formed, the lens elements may be assembled in the lens barrel surrounding wall first, and then the cover member may be fixed on the connecting portion of the lens barrel surrounding wall close to the object side. That is, the sequence of lens element assembly is not limited by the aperture of the light-passing hole surrounded by the cover member being smaller than the size of the lens elements, and the lens element assembly sequence from the image side end to the object side end in sequence may be achieved. In this way, the inner diameter of the lens element accommodating portion of the lens barrel surrounding wall may be gradually reduced from the object side to the image side, so that the outer diameter of the lens element close to the image side may be reduced, thereby improving lens manufacturing yield. In particular, when the condition that the maximum outer diameter of the lens barrel surrounding wall corresponding to where the inner side surface of the lens element accommodating portion and the first lens element counted from the object side are abutted is less than the maximum outer diameter of the lens barrel surrounding wall corresponding to where the inner side surface of the lens element accommodating portion and the first lens element counted from the image side are abutted is satisfied, the area of the portable electronic screen occupied by the lens may be reduced.

4. In the present application, the lens barrel is divided into two parts: the cover member and the lens barrel surrounding wall. When the lens elements are assembled, because the cover member and the lens barrel surrounding wall are not integrally formed, the lens elements may be assembled in the lens barrel surrounding wall first, and then the cover member may be fixed on the connecting portion of the lens barrel surrounding wall close to the object side. That is, the sequence of lens element assembly is not limited by the aperture of the light-passing hole surrounded by the cover member being smaller than the size of the lens elements, and the lens element assembly sequence from the image side end to the object side end in sequence may be achieved, wherein when the lens barrel satisfies $(DS3-DS4)/(DS1-DS2) \geq 6.000$, the outer diameter of the lens element close to the image side may be reduced, and the volume of the lens barrel close to the object side may be reduced, while improving the lens element manufacturing yield and achieving the object of reducing the lens volume. The preferred range is $6.000 \leq (DS3-DS4)/(DS1-DS2) \leq 28.000$.

5. When the maximum outer diameter of the cover member is less than or equal to the maximum outer diameter of the connecting portion of the lens barrel surrounding wall, the volume of the object side end of the lens may be reduced.

6. When the object side surface of the cover member facing the object side has texture, light is not readily reflected when hitting the cover member, thus helping to keep the appearance of the lens consistent with the color of the screen.

7. The method of fixing the cover member and the lens barrel surrounding wall with colloid does not require fixing by other structures or fixing members, and the size of the cover member may also be designed to be smaller at the same time, so as to avoid increasing the volume of the object side end of the lens. In particular, there is a colloid accommodating space between the cover member and the lens barrel surrounding wall, and the cover member has a chamfer allowing the colloid to more readily flow into the colloid accommodating space. Preferably, when the cover member has an outer side surface connected to the image side connecting surface and facing away from the optical axis, the outer side surface and the object side connecting surface of the lens barrel surrounding wall form an included angle of less than 90 degrees, thus not only making it easier for the colloid to flow into the colloid accommodating space, but also making it easier to control the amount of adhesive dispensed and avoid adhesive overflow.

8. In order to reduce the volume of the lens barrel, the following methods may be used:
   (1) Having a sectional plane parallel to the optical axis on the outer surface of the lens barrel surrounding wall; and
   (2) At least one of the plurality of lens elements has a sectional plane formed between the object side surface of the lens elements and the image side surface of the lens elements, wherein the optical boundaries with the sectional plane of the lens elements is different from the optical boundaries without the sectional plane of the lens elements.

9. When the lens barrel 100 satisfies $(R1-R3)/(R3-R2) \leq 0.500$, the gradual shrinkage of the lens element accommodating portion 110 from the object side A1 to the image side A2 may be slower, thereby improving manufacturing yield.

10. When the lens barrel 100 satisfies $SL/R1 \leq 2.000$, it is beneficial to design a wide-angle lens or a lens with a large luminous flux, and at the same time, the effect of shortening the length of the lens system is achieved. In particular, a preferred range of $(R1-R3)/(R3-R2)$ is $0.800 \leq SL/R1 \leq 2.000$.

11. The minimum aperture of the light-passing hole formed by the cover member surrounding the optical axis is less than the inner diameter of the lens element accommodating portion closest to the object side, so that the cover member has the function of blocking stray light and fixing the lens elements at the same time.

12. In addition, when the lens barrel 100 satisfies the following conditional formulas, the lens barrel 100 has excellent effects whether the lens barrel 100 is applied to a wide-angle lens, a telephoto lens, or a lens with a large luminous flux, but is not limited thereto.

In particular,
the lens barrel 100 may satisfy $DS1 > R1+1.20$;
the lens barrel 100 may satisfy $DS2 \leq DS1$;
the lens barrel 100 may satisfy $DS3 > DS4+0.60$;
the lens barrel 100 may satisfy $DS4 < R1-0.50$;
the lens barrel 100 may satisfy $R2 < R1-0.10*E-1.00$; and
the lens barrel 100 may satisfy $R3 < R1-(0.10*E/2)$.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A lens barrel, comprising:
a lens barrel surrounding wall surrounding an optical axis, the lens barrel surrounding wall comprises a lens element accommodating portion abutted against a plurality of lens elements, the lens barrel surrounding wall has an object side connecting surface closest to an object side and facing the object side, and an inner diameter of the lens element accommodating portion closest to the object side is greater than an inner diameter of the lens element accommodating portion closest to an image side; and
a cover member having an image side connecting surface facing the image side, and the image side connecting surface of the cover member is fixed on the object side connecting surface of the lens barrel surrounding wall, wherein a maximum outer diameter of the cover member is less than or equal to a maximum outer diameter of the lens barrel surrounding wall,
wherein the lens barrel further satisfies the following conditional formula: $(R1-R3)/(R3-R2) \leq 0.500$, wherein R1 is the inner diameter of the lens element accommodating portion closest to the object side, R3 is an inner diameter of the lens element accommodating portion corresponding to a position at half of a distance between the lens element accommodating portion closest to the object side and the lens element accommodating portion closest to the image side along the optical axis, and R2 is the inner diameter of the lens element accommodating portion closest to the image side.

2. The lens barrel of claim 1, wherein an outermost edge of a first lens element counted from the object side is abutted against an inner side surface of the lens element accommodating portion facing the optical axis.

3. The lens barrel of claim 1, wherein the cover member has an outer side surface connected to the image side connecting surface and facing away from the optical axis, and the outer side surface forms an included angle of less than 90 degrees with the object side connecting surface of the lens barrel surrounding wall.

4. The lens barrel of claim 1, wherein the cover member and the lens barrel surrounding wall are fixed with a colloid.

5. The lens barrel of claim 4, wherein there is a colloid accommodating space between the cover member and the lens barrel surrounding wall, and the cover member has a chamfer.

6. A lens barrel, comprising:
a lens barrel surrounding wall surrounding an optical axis, the lens barrel surrounding wall comprises a lens element accommodating portion abutted against a plurality of lens elements, the lens barrel surrounding wall has a connecting portion close to an object side, an inner diameter of the lens element accommodating portion closest to the object side is greater than an inner diameter of the lens element accommodating portion closest to an image side, both a first lens element counted from the object side and a first lens element counted from the image side are abutted against an inner side surface of the lens element accommodating portion facing the optical axis, and a maximum outer diameter of the lens barrel surrounding wall corresponding to where the inner side surface of the lens element accommodating portion is abutted against the first lens element counted from the object side is less than a maximum outer diameter of the lens barrel surrounding wall corresponding to where the inner side surface of the lens element accommodating portion is abutted against the first lens element counted from the image side; and
a cover member fixed on the connecting portion of the lens barrel surrounding wall,
wherein the lens barrel further satisfies the following conditional formula: $(R1-R3)/(R3-R2) \leq 0.500$, wherein R1 is the inner diameter of the lens element accommodating portion closest to the object side, R3 is an inner diameter of the lens element accommodating portion corresponding to a position at half of a distance between the lens element accommodating portion closest to the object side and the lens element accommodating portion closest to the image side along the optical axis, and R2 is the inner diameter of the lens element accommodating portion closest to the image side.

7. The lens barrel of claim 6, wherein a maximum outer diameter of the cover member is less than or equal to a maximum outer diameter of the connecting portion of the lens barrel surrounding wall.

8. The lens barrel of claim 6, wherein the lens barrel further satisfies the following conditional formula: $SL/R1 \leq 2.000$, wherein SL is a distance along the optical axis from a position of the cover member closest to the object side to a position of the lens barrel surrounding wall closest to the image side, and R1 is the inner diameter of the lens element accommodating portion closest to the object side.

9. The lens barrel of claim 6, wherein the lens barrel surrounding wall has an outer surface facing away from the optical axis, and the outer surface has a sectional plane parallel to the optical axis.

10. The lens barrel of claim 6, wherein a minimum aperture of a light-passing hole formed by the cover member surrounding the optical axis is less than an inner diameter of the lens element accommodating portion closest to the object side.

11. The lens barrel of claim 6, wherein an inner diameter of the lens element accommodating portion is gradually reduced along with the lens elements from the object side to the image side.

12. A lens barrel, comprising:
a lens barrel surrounding wall surrounding an optical axis, the lens barrel surrounding wall comprises a lens element accommodating portion abutted against a plurality of lens elements and an outer surrounding surface facing away from the optical axis, a second lens element counted from an image side is abutted against an inner side surface of the lens element accommodating portion facing the optical axis, and the lens barrel surrounding wall also has a connecting portion close to an object side; and
a cover member fixed on the connecting portion of the lens barrel surrounding wall, and the cover member is not in direct contact with the outer surrounding surface;
wherein the lens barrel satisfies the following conditional formula:
$(DS3-DS4)/(DS1-DS2) \geq 6.000$, wherein DS1 is a vertical distance between a position of the outer surrounding surface closest to the object side and the optical axis, DS2 is a maximum outer diameter of the cover member, DS3 is a maximum outer diameter of the lens barrel surrounding wall corresponding to where the inner side surface of the lens element accommodating portion is abutted against the second lens element counted from the image side, and DS4 is a maximum inner diameter of the lens barrel surrounding wall corresponding to where the inner side surface of the lens element accommodating portion is abutted against the second lens element counted from the image side.

13. The lens barrel of claim 12, wherein the cover member has an object side surface facing the object side, and the object side surface has a texture.

14. The lens barrel of claim 12, wherein each of the lens elements has an object side surface facing the object side and an image side surface facing the image side, and at least one of the lens elements has a sectional plane formed between the object side surface and the image side surface, wherein optical boundaries with the sectional plane of the lens elements are different from optical boundaries without the sectional plane of the lens elements.

15. The lens barrel of claim 12, wherein a minimum aperture of a light-passing hole formed by the cover member surrounding the optical axis is less than an inner diameter of the lens element accommodating portion closest to the object side.

16. The lens barrel of claim 12, wherein an inner diameter of the lens element accommodating portion is gradually reduced along with the lens elements from the object side to the image side.

17. The lens barrel of claim 12, wherein the cover member and the lens barrel surrounding wall are fixed with a colloid.

18. The lens barrel of claim 17, wherein there is a colloid accommodating space between the cover member and the lens barrel surrounding wall, and the cover member has a chamfer.

* * * * *